United States Patent [19]
Babel et al.

[11] Patent Number: 5,560,661
[45] Date of Patent: Oct. 1, 1996

[54] HIGH PRESSURE MECHANICAL SEAL

[75] Inventors: Henry W. Babel, Huntington Beach; Raymond H. Anderson, Santa Ana, both of Calif.

[73] Assignee: McDonnell Douglas Corporation, Huntington Beach, Calif.

[21] Appl. No.: 387,106

[22] Filed: Feb. 10, 1995

[51] Int. Cl.⁶ ............................ F16L 11/12; F16L 35/00; B21D 39/04
[52] U.S. Cl. ...................... 285/382; 428/336; 285/382.2; 285/329
[58] Field of Search .................... 428/336, 334; 285/382, 382.1, 382.2, 329, 173, 422; 29/458, 508, 520

[56] References Cited

U.S. PATENT DOCUMENTS

| | | | |
|---|---|---|---|
| 2,741,498 | 4/1956 | Elliott | 285/382 |
| 3,287,034 | 11/1966 | Bragg | 285/382 |
| 3,474,519 | 10/1969 | Hallesy | 285/382 |
| 3,477,750 | 11/1969 | Powell | 285/382 |
| 4,705,302 | 11/1987 | Beiley | 285/382.2 |
| 5,262,241 | 11/1993 | Huggins | 428/421 |
| 5,296,285 | 3/1994 | Babel et al. | 428/213 |
| 5,401,573 | 3/1995 | Babel et al. | 428/336 |

*Primary Examiner*—Eric K. Nicholson
*Attorney, Agent, or Firm*—Ronald M. Goldman; Ronald L. Taylor

[57] ABSTRACT

A relatively impervious mechanical seal is formed between the outer surface of a tube and the inside surface of a mechanical fitting of a high pressure fluid or hydraulic system by applying a very thin soft metal layer onto the outer surface of the hard metal tube and/or inner surface of the hard metal fitting. The thickness of such thin metal layer is independent of the size of the tube and/or fittings. Many metals and alloys of those metals exhibit the requisite softness, including silver, gold, tin, platinum, indium, rhodium and cadmium. Suitably, the coating is about 0.0025 millimeters (0.10 mils) in thickness. After compression, the tube and fitting combination exhibits very low leak rates on the order or $10^{-8}$ cubic centimeters per second or less as measured using the Helium leak test.

14 Claims, 2 Drawing Sheets

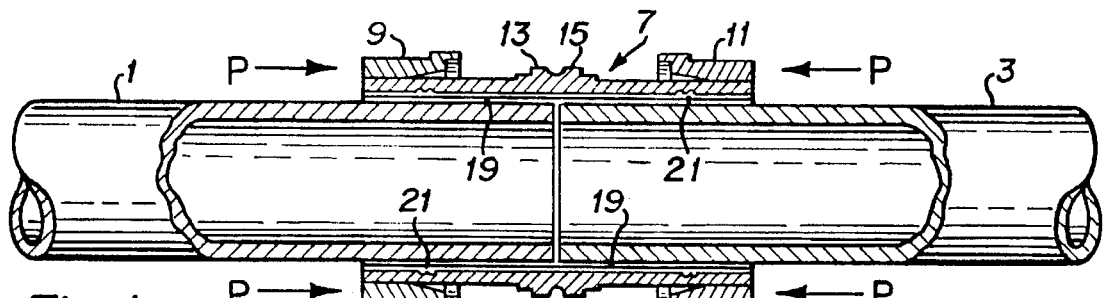
Fig_1
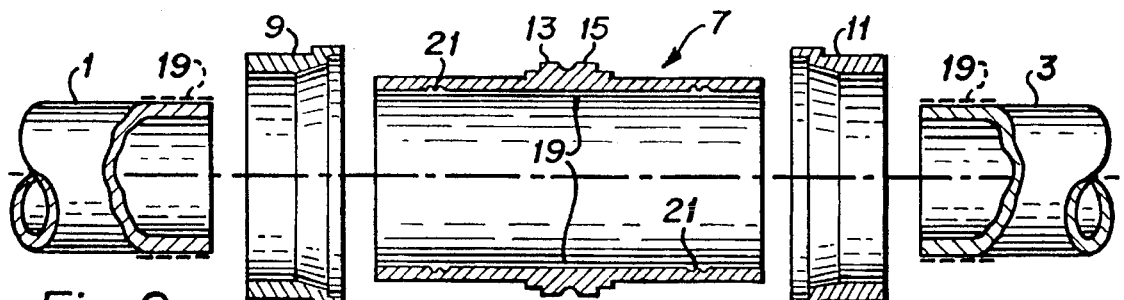
Fig_2
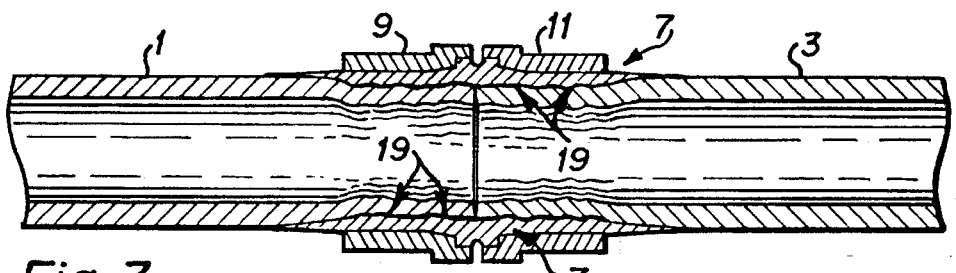
Fig_3
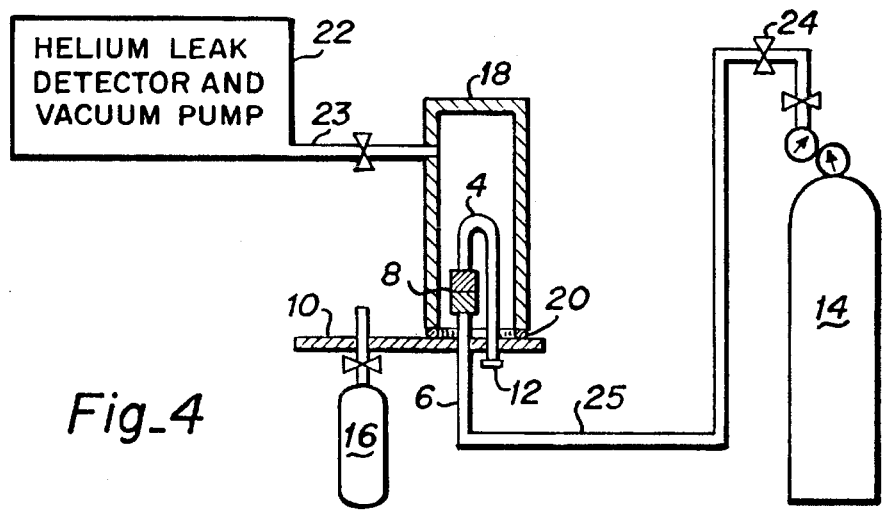
Fig_4

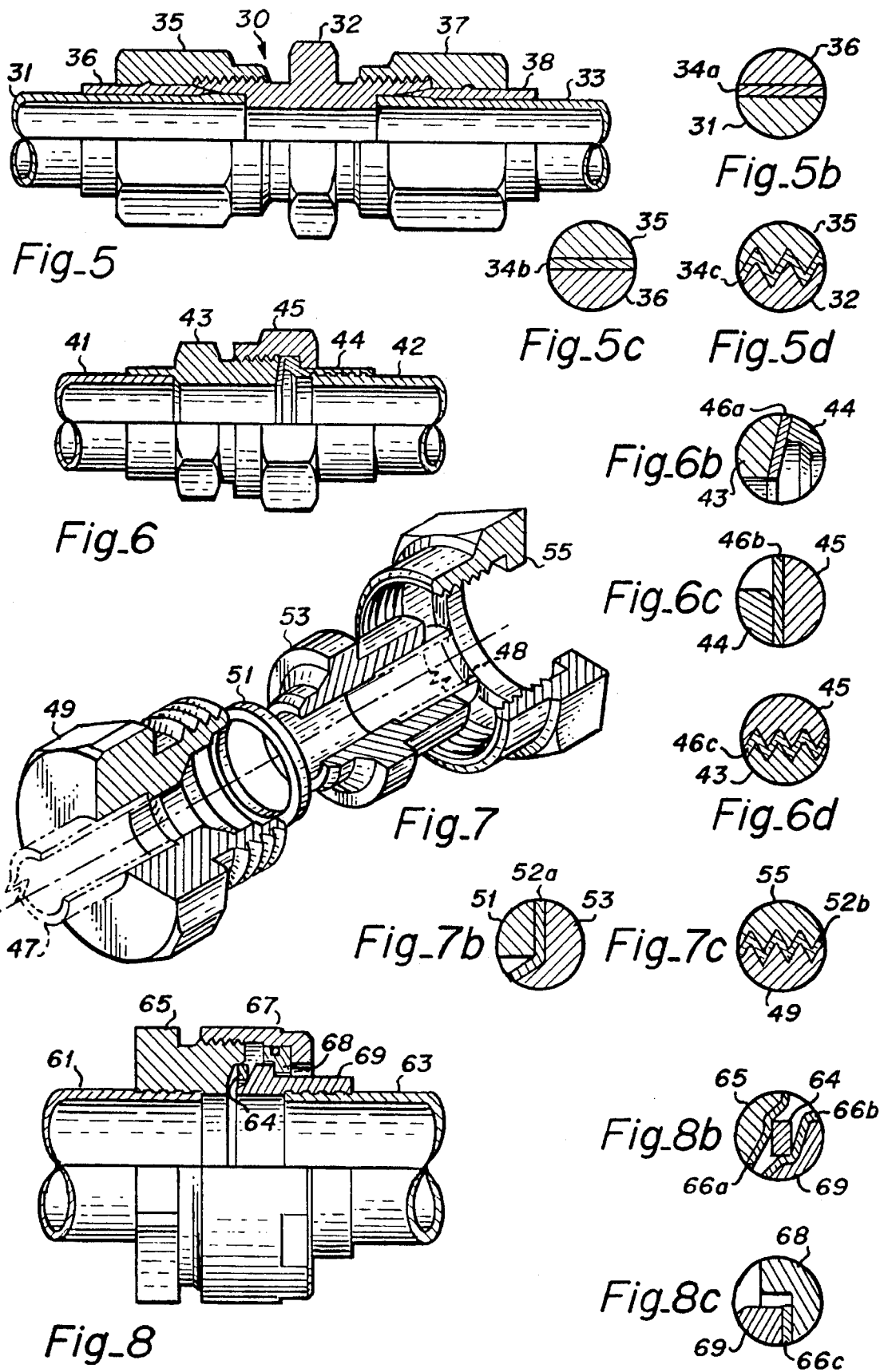

HIGH PRESSURE MECHANICAL SEAL

The invention described herein was made in the performance of NASA contract NAS 9-18200 and is subject to the provisions of the National Aeronautics and Space Act of 1958 (42 U.S.C. 2457).

This application is related to application Ser. No. 08/196,665, filed Feb. 15, 1994, entitled High Pressure Mechanical Seal, copending herewith, for which the benefit of 35 U.S.C. 120 is claimed.

FIELD OF THE INVENTION

This invention relates to high pressure fluid line joints and, more particularly, to an improved sealed connection between the fitting and fluid line having a low leakage characteristic.

BACKGROUND

Swaging, mechanically squeezing a fitting onto a tube, is a known technique for joining mechanical fittings onto tubes found in high pressure fluid systems. The construction of high pressure fluid systems, those operating above one hundred psig, often requires use of such mechanical fittings to join tube sections together in a mechanical swaging process in circumstances in which other techniques, such as welding, brazing, or soldering, cannot be used. In the aerospace field a variety of different mechanical fittings are available for that application and, while relatively impervious, all leak to some slight degree.

Typically the smallest leak rate achieved with such mechanical fittings, as swaged to the fluid line and using Helium as the pressurizing medium, is $10^{-6}$ cubic centimeters per second. It is found that the leakage is even greater when the outside of the tube lines are covered with a hard metal plating material, such as nickel or chrome. In the latter case good seals with leak rates of $10^{-6}$ cubic centimeters per second, or less, cannot be achieved, which is believed to be principally due to the inability of the hard metal plating to deform during the fitting swaging process. Although a leak rate of $10^{-6}$ cc per second is acceptable in practice, it is found in aircraft, as example, after some period in service, the leakage rate of some fittings increases, often rising to unacceptable levels. That increase may be attributed to the harsh aircraft environment, particularly the adverse effect of temperature cycling, sustained or cyclic pressure, and vibration acting on the fittings.

Fluid leaks in those aircraft fluid systems are repaired when the aircraft returns to base. Such leaks often prove difficult and costly to repair, due to having poor access to the location of the leak in the aircraft. For permanent space station application locating and repairing a major leak in a fluid system requires major effort; a situation that should be avoided if at all possible. The obvious manner of avoiding that difficult situation is to eliminate the use of mechanical fittings in fluid systems for space application, a prohibitively expensive alternative and, hence, impractical. Welding is not as yet an acceptable practice for making repairs in the outer space environment. As a consequence, mechanical fittings remain a practical necessity both for initial fabrication and repair.

The invention solves the problem of achieving the required low leak rate standard for fluid lines, by providing significantly lower initial leakage rates than is available with prior constructions of mechanical fittings. The foregoing is achieved with a slight inexpensive modification to the structure of the standard mechanical fittings and/or tubing. The improved sealing is attained on nickel, chrome or any other hard plated metal surface as well as on the conventional titanium, aluminum, stainless steel, inconel and monel tubing.

As further background it is noted that the use of welding as a means of providing an impervious connection or joint between tubes in high pressure systems is a known alternative coupling or joining technique. However, the present invention is premised on the avoidance of any welds or welding process. Welding is avoided as a repair technique in difficult to work environments. The use of wet solder is also known as a means to join tubing together. However, although soldered joints are useful in low pressure water and gas plumbing systems, they fail in high pressure fluid systems. Even though the principal advantage of the invention and motivation for the invention is in high pressure hydralic and fluid systems, it is recognized that the invention is not so limited in application. It may also be employed in low pressure systems as an alternative to existing joining techniques.

An object of the invention, therefore, is to provide a mechanical seal of high integrity for high pressure fluid systems;

Another object is to provide a high pressure mechanical seal that is applied by a swaging process;

A further object of the invention is to convert existing mechanical fittings, found to have leak rates of $10^{-6}$ cubic centimeters per second or less, as measured using Helium, into higher quality fittings that have leak rates of only $10^{-8}$ cubic centimeters per second or less; and An additional object of the invention is to provide a mechanical seal structure which exhibits leakage that does not exceed a leakage rate on the order of $10^{-8}$ cubic centimeters per second or better without the necessity and expense of materially changing the mechanical design and size of existing fittings and tubes.

SUMMARY OF THE INVENTION

As addressed in related co-pending application Ser. No. 08/196,665, filed Feb. 15, 1994, assigned to the same assignee, the outer surface of the metal tube and/or the inner surface of a standard swage mechanical fitting, which are formed of hard metals, is covered with a very thin layer of a soft metal, integral therewith, prior to swaging the fitting onto the tube. Suitably the soft metal layer is very thin, essentially 0.0025 millimeters (0.10 mils) in thickness, and is independent of the thickness or diameter of the tube and fitting. The soft metal layer's thickness desirably falls within the range of normal engineering tolerances in dimensions for such fittings and tubes, which typically is 0.25 millimeters (ten mils).

Such soft metal may be formed of silver, gold, platinum, tin, rhodium, indium, cadmium and many other soft metals. In accordance with a practical aspect of the invention, the fitting may comprise any standard hard metal material, such as aluminum, stainless steel and/or titanium, and the tube may comprise the same metals used in the fitting as well as alloys Inconel and Monel, and may even be a tube that is nickel or chrome plated. The soft metal is applied to the tube and/or fitting by any standard plating process or by any other available standard production processes.

Upon swaging the fitting onto the tube, a process in which the fitting is mechanically squeezed and permanently deformed by radial forces to reduce the diameter of the fitting and press the inner surface of the fitting against the outer surface of the tube, with the soft metal layer in place a connection or joint is completed between the fitting and tube that produces a more impervious seal between those elements. Not only is the mechanical seal better upon initial fabrication, it is also more reliable over periods of time in service. The joint is able to maintain its low leak characteristic following thermal cycling and/or vibrational and mechanical loading, thereby improving reliability over many prior joint structures, which often exhibit increased leak rates following only a limited number of thermal or mechanical cycles.

In accordance with the present invention, such technique is applied also to other types of mechanical fluid couplings or fittings, as variously termed, that employ compression to form a fluid tight seal.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 1 illustrates pictorially in section an embodiment of the invention with the elements positioned in mating engagement prior to swaging;

FIG. 2 is a pictorial exploded partial section view illustrating several elements of FIG. 1 more clearly, including the thin metal layer and its application to alternative elements of that embodiment;

FIG. 3 is a partial section of the embodiment of FIG. 1 following swaging, showing the final relationship of the elements including the formed mechanical seal;

FIG. 4 illustrates a helium leak test arrangement used to check the integrity of the embodiments of the invention;

FIG. 5 is an embodiment of a compression fitting constructed according to the invention that is illustrated in a partial cut-away view and FIGS. 5b, 5c and 5d are enlarged partial section views of a portion of FIG. 5;

FIG. 6 illustrates another compression fitting embodiment constructed according to the invention that is illustrated in a partial cut-away view and FIGS. 6b, 6c and 6d are enlarged partial section views of a portion of FIG. 6;

FIG. 7 is an exploded view of another compression fitting with the invention and FIGS. 7b and 7c are enlarged partial section views of a portion of FIG. 7; and FIG. 8 is a partially cut away side view of still another compression fitting that makes use of the invention and FIGS. 8b and 8c are an enlarged partial section views of a portion of FIG. 8.

DETAILED DESCRIPTION OF THE PREFERRED EMBODIMENTS

Reference is made to FIG. 1 which shows the fluid line in section, pictorially, with the elements positioned ready for swaging, comprising tubes 1 and 3, coaxially arranged end to end and defining a fluid passage, which are formed of Stainless Steel or any other metal tube material, and a metal fitting, including a fitting sleeve 7 and two fitting rings 9 and 11, as is conventional, formed of Titanium or any other hard metal material conventional for a fitting. The fitting is mounted to tubes 1 and 3, and bridges the confronting ends of the adjacent tubes 1 and 3.

Sleeve 7 is of a generally cylindrical geometry that fits over the ends of tubes 1 and 3, bridging those sections of the fluid line. The sleeve is tapered to provide a section at each of the right and left ends that is of reduced outer diameter. The sleeve also contains a pair of integral rings 13 and 15 protruding from the outer surface and a pair of spaced apart grooves 21 in its inner surface, only one of which is labeled, circumscribing the inner surface, which are of conventional structure and function. Each ring is also generally cylindrical in shape, containing an internal generally cylindrical geometry that initially fits over the tube and the reduced diameter portion of the sleeve, prior to swaging, an outwardly tapered conical section adjacent the front of the ring that fits over the indentation in sleeve 7, prior to swaging, and a still larger internal cylindrical section at the front end, which is adapted to receive one of the sleeve rings that protrude from the outer surface of sleeve 7. Rings 9 and 11 are oriented in the assembly with the front ends facing one another. The sleeve and rings are of conventional structure. Those familiar with swage fittings should recognize the structure as a bare titanium "Aeroquip Rynglok" brand swage fitting, obtained from the Aeroquip Corporation of Jackson, Mich., Either the inside diameter of fitting 7 or the outside diameter of tubes 1 and 3 carry a thin soft metal coating 19, suitably of Tin or other soft metal, which is applied by any conventional technique, suitably by a standard plating processes. This is better illustrated in FIG. 2, to which brief reference is made, illustrating the elements, in somewhat of an exploded view, prior to assembly in the mating engagement presented in FIG. 1 where the assembly was ready for swaging. The thin metal layer 19 is represented by the thick solid black line. The spacing between the layer and the adjacent surface that supports the thin layer is for purposes of illustration only, permitting better illustration of that metal layer. The correct physical relationship is as described by the text of this specification.

In a first embodiment, the thin metal layer may be located on the end portions of tubes 1 and 3, extending axially rearwardly away from the tubes end a short distance. Alternatively, in another embodiment, the thin metal layer 19 is located on the inside cylindrical wall of fitting 7, and extends substantially the length of the fitting. Although it is possible and within the scope of the invention to apply an even thinner layer to each of the tubes and fitting, such is not believed to be cost effective or necessary and so is not preferred.

The plating of the soft metal coating is accomplished by either plating in an electroysis plating bath, which is initially preferred, or by brush plating, which are known processes. It may also be applied to the fitting and/or tube by any other known commercial processes as well, such as vacuum deposition or plasma spraying. The soft metal layer is plated onto the tube to a thickness of 0.0025 millimeters (0.10 mils). In the illustrated combination the soft metal plating is located intermediate the fitting element and the outer tube surface. Upon completion of swaging the metal layer is essentially deformed between those two elements.

Returning to FIG. 1, the sealing connection between the fitting and tube is formed in a mechanical swaging process, a known technique. As shown in the figure, the outer surface of the tube is plated with the soft metal. That same soft metal may also be plated on the inside of the swage fitting as well if desired. Thereafter, for swaging, the fitting is placed on the tube overlying the plating. Each fitting ring is mounted on the tube, the fitting sleeve is placed over the tube ends and the rings are then moved longitudinally along the axis of the tubes to the position overlying a portion of the fitting sleeve. Then the fitting is compressed or swaged onto the tube, resulting in a frictional fit there between, specifically forcing fitting ring 9 to the right and fitting ring 11 to the left, as indicated by the arrows P in FIG. 1, until the rings engage and lock to sleeve rings 13 and 15 respectively. As the rings are moved it squeezes the larger diameter portion of the sleeve within the smaller diameter internal cylindrical section of the ring, and compresses the fitting sleeve.

Swaging places a radial compressive squeezing force on the fitting that yields the inner fitting surface. That action reduces the diameter of its inner surface pressing it against the intermediate layer and there through onto the tube. Hence when the compressive swaging force is withdrawn, the fitting retains its new shape pressed tightly onto the tube and the two tubes remain permanently joined.

Following swaging, the formed joint appears in section as presented in FIG. 3, in which the elements described are given the same numerical designation as in FIG. 1. As shown in the figure the soft thin metal layer 19 is deformed as is as a portion of the tube. Since the intermediate metal layer is softer in physical characteristic than either the tube or fitting, portions of that soft metal layer are flowed or moved into any vacant areas, interstitial space, scratches, pores, however slight, as may be found to exist between the fitting and tube.

The invention provides extremely leak tight joints. It succeeds in application to tubing that has been plated with hard metal coatings, such as chrome or nickel, where all standard fittings would fail to meet a leak requirement of no greater than $10^{-6}$ cc/sec with the Helium leak test. It maintains acceptable levels of leak resistance in service better than the present mechanical fittings. It may be employed with any mechanical fitting and tube combination. To great advantage industrially, the mechanical dimensions of existing fittings are not required to be modified, because the soft metal coating is extremely thin, falling within the normal dimensional tolerance variation acceptable for the elements, thereby avoiding the expense of redesigning fitting dimensions and the accompanying engineering drawings. In this respect, existing fittings and tubes are easily converted to the form required by this invention to provide a higher quality fitting.

In a practical embodiment of the invention a bare titanium "Aeroquip Rynglok" brand swage fitting, obtained from the Aeroquip Corporation of Jackson, Mich., was swaged onto a nickel plated stainless steel tube that had the appropriate portion of the outer surface plated with a 0.0025 millimeter (0.10 mil) thickness of tin plate. The measured leakage using the Helium leak test medium was less than $10^{-8}$ cubic centimeters per second, an improvement in leak rate of 100,000 over the prior $10^{-3}$ cubic centimeters per second rate. In effect the soft metal coating appears to fill any microscopic interstitial space or leak gaps between the tube and fitting, analgous to the action of pipe thread filler in low pressure fluid systems.

It is also appreciated that the layer thickness that proved satisfactory result in the foregoing embodiment could be varied to some degree, either greater or less, but the appropriate range for any particular metal has not as yet been experimentally determined. Effectively, any degree of thinness that attains a like or better result may be used in accordance with the present invention.

Although the thin soft metal coating was applied to the tube in the preceeding embodiment, it is recognized that such coating may instead be applied to the inner surface of the fitting with the same result achieved in the combination. Further such coating may be applied in two parts, one of which is applied onto the outer surface of the tube and the other of which is applied onto the inner surface of the fitting to the same effect. All of the foregoing alternatives are encompassed within the invention.

In the foregoing description reference is made to metals which are hard and those which are soft and examples of each were given. However, that is not intended to exhaust the list of all possible metals and alloys which are either hard or soft, recognizing that no objective standard of hardness is presented, except that which is gleaned from the foregoing examples. Essentially the metal applied as the sealing layer should not be as hard as the supporting fitting or tube, respectively, in the sense that the sealing layer gives way or mechanically flows when subjected to the swaging force, before the supporting surface in which event the latter surface is deemed to be hard and the sealing surface layer is deemed to be soft.

In addition to tin, earlier discussed, it is believed that other metals are suitably soft and useful in the combination, as example, any of silver, gold, tin, platinum, indium, rhodium, zinc, copper and cadmium as well as alloys of such metals. The specific metal or alloy is selected to have the appropriate coefficient of expansion to ensure that the seal is maintained at the temperature or temperature range to which the fluid system is subjected in its intended application. That is, the fluid system may be one intended to be maintained in operation at cold temperatures, particularly cryogenic temperatures, or one that is used at elevated temperatures, or in an application in which the fluid system cycles between warm and cold temperatures. The state of Applicant's knowledge on the novel technology does not permit adequate selection theory on such refinements to the invention, except to suggest case by case trial and error. However, it is anticipated that others, given this description, through experiment, will find other specific metals that have such hard and soft relationship and thickness acceptable for the combination as described and for the specific application, whether cryogenic temperatures, high temperatures and/or applications in which the temperature cycles between a high and low temperature.

It is also recognized that some of the other soft metal materials given in the preceding description will react with certain chemicals. Hence in defining a particular joint structure, adequate attention is taken to ensure that the metal or alloy selected for the soft thin metal layer does not react with the fluid or gas in the intended fluid system application. As example the fluid line formed by tubes 1 and 3 in the embodiment of FIGS. 1 and 2 using gold as the soft metal, may be used to carry oxygen, a gas, at pressures of 3,000 pounds per square inch or greater, since oxygen does not adversly react with gold.

The foregoing leak rates have been presented in terms of the known helium leak test standard. That test is a standard for establishing leak rates that is well recognized and is extensively used by those engaged in leak testing. With the exception of hydrogen gas, the molecules of helium are smaller than other gases and liquids. Hence helium represents a more severe condition than is actually encountered in practice by other gases, such as Oxygen, and fluids.

Although those skilled in the art are knowledgable in pressure testing and, particularly in the Helium leak test, as an endnote for the benefit of other readers, a description of the test set up may be helpful. As shown symbolically in FIG. 4, a 9.53 millimeter (3/8th inch) outside diameter stainless steel tube 4, 61 centimeters (24 inches) in length and 0.89 millimeters (0.035 inch) wall thickness, is formed with a bend located about 10 centimeters (four inches) from the end, with the bend diameter being approximately 7.6 centimeters (three inches). The tube was attached to an 20.3 centimeter (eight inch) length of the same tubing 6 by a mechanical tube fitting 8. The fittings were attached using the Enerpak P-142 fitting attachment device that is supplied by the manufacturer with the Rynglok brand fittings. The assembled fitting was mounted on a steel plate 10 with the fitting 8 located on one side and the tube ends located on the opposite side of the steel plate. The through holes on the mounting plate were sealed and the tube ends were flared at thirty seven degrees with AN nuts and sleeves 12 and plumbed into a high pressure helium tank 14, containing standard pressure relief valves and other customary valves. A $10^{-8}$ standard helium leak and a $10^{-6}$ standard helium leak 16 were attached to the mounting plate. A stainless steel movable vacuum chamber 18 having a butyl rubber "O" ring 20 on the bottom rim end was attached to a CEC model 24-120B helium leak detector and roughing pump 22.

The tube fittings were pressurized to 3,000 psi with helium. The vacuum chamber was placed over the standard leaks, and a vacuum was pulled on the chamber with the roughing pump. The standard leaks were then measured with the helium leak detector. Leakage values for the fitting 8 was calculated by taking the ratio of the fitting reading to the nearest standard leak reading and multiplying that by the standard leak value.

Although the present invention is particularly useful for space applications, as those skilled in the art appreciate, because of the minor additional cost involved, it can also serve in the more mundane applications in aircraft, in chemical processing industries, in the nuclear industry, and the like since the greater reliability of the seal technique serves to reduce maintenance costs and downtime. As those skilled in the art appreciate, the improved joint achieves low leak rates without use of any elastomeric seals, which is an advantage.

Fittings with metal seals can be subjected to a larger range of temperatures than seals that incorporate organic elastomeric materials, such as rubber, and the metal seals can be subjected to higher temperatures and lower temperatures than organic ones. These are not temperatures above 500 degrees Centigrade (932 degrees Fahrenheit), but the more modest temperatures used in the chemical processing industries for which the present invention is useful. Gold, as example, has a relatively high melting temperature, and can function at higher temperatures than elastomeric seals. Typically for most elastomeric compounds, excepting silicone, the minimum temperature at which the compound may effectively be used is between −40 to −51 degrees Centigrade (−40 to −60 degrees Fahrenheit).

Further, many fluids and gases are not compatible with elastomers. Gold, as example of a soft metal, is inert to all but a very few chemicals. Consequently those joint assemblies in which gold is selected as the soft thin metal layer will have widest application for reliable operation with most fluids and gases and, hence, despite the slightly higher material cost, may be more preferable to tin used in the example earlier given.

The advantageous discovery described in connection with swage fittings is discovered to be applicable to other kinds of known fluid couplings that employ compression to ensure a fluid tight seal between the coupling elements, an application which is considered to be related to the foregoing swage fittings. Generally speaking some types of common fluid couplings are joined together by threaded hollow nuts. Torquing the nut like members during assembly creates compressive force between the threads of the mating members, and also compresses a metal sleeve and/or a metal ring seal, the latter sometimes referred to as a metal Oring seal. Since the term O-ring seal originated with rings of circular cross section formed of resilient rubber and/or polymer material, the use is technically incorrect, but nontheless the term appears to form a portion of the jargon in this field. By applying 0.1 mil (0.0025 millimeters) layers of the relatively soft metal, such as gold, to the surfaces of the coupling that are compressively engaged as assembled, significantly increased integrity, as in the swage joint embodiments previously described, is obtained for the seal.

In practice one discovers that to obtain the desired sealing one need not torque the threaded members as greatly as before. With reduced torque required in assembling the coupling there is less possibility for overtorquing and damaging the coupling. Thus as applied to threaded fluid couplings, not only is it possible to achieve the same advantages obtained with the swage fittings, the high levels of sealing without changing the dimensional manufacturing tolerances for the fittings, application of large torques is no longer critical. Since threaded couplings offer a slightly more convenient technique than swage joints for assembly in the field, the technique provides obvious utility.

In such additional embodiments, the threaded mechanical coupling is modified by applying the thin soft metal layer, as example, to at least one of the abutting surfaces that are intended to be compressed or pressed together, the layer being so thin as to fall within the dimensional tolerances prescribed for the coupling. And, as a back up seal for extra precaution, a like layer is applied to at least one of the mating male and female screw threads in the coupling. By torquing the coupling elements, compressive force is exerted between the abutting surfaces and the threads, squeezing and distorting the intervening thin soft metal layer between the harder metal surfaces, wherein the respective thin metal layer mechanically fills any interstitial space between the abutting elements and the threads, achieving the tight seal desired.

The foregoing structural modification is better understood by considering the additional embodiments of the invention illustrated in FIGS. 5 through 8, which are next discussed at greater detail. It should be noted that the fluid couplings illustrated in the subsequent figures are of generally conventional structure, except for the additional thin soft metal layers added in the practice of the present invention. All such conventional elements are formed to standard dimensional tolerances for such couplings, which typically is about 0.25 millimeters (ten mils), from relatively hard metal.

Reference is made to FIG. 5 which illustrates a fluid coupling 30 in side view, partially cut-away to reveal a partial section view of a portion of the internal structure. The fluid coupling joins two lengths of metal tubing, 31 and 33, together, completing a high pressure fluid path through the conduit. The coupling includes fitting 32, a hollow nut like coupling 35 having an internal threaded passage, located to the left in the figure, and another like nut like coupling 37, threaded in the reverse direction from nut 35, located on the right side in the figure. The outer surface of a portion of the nut is a conventional six sided hexagonal figure so that surface may be gripped by a wrench. Each nut coupling, 35 and 37, is of a generally cylindrical shape with a disk shaped bottom having a central opening.

The central opening in nut 35 fits over a metal compression sleeve 36, which is of conventional shape; the sleeve is generally cylindrical, having a raised portion to form a lip circumscribing the outer surface and tapers toward the front end, in section view simulating a wedge. As shown, the rear end wall of nut coupling 35 engages the lip on the associated compression sleeve. A like structure and relationship is illustrated on the right side with compression sleeve 38 and coupling nut 37.

The fitting 32 contains an hollow passage, a hexagonal nut like central portion and an extended externally threaded projecting portion on each side of the nut like central portion with the threads of the two portions in counter-clockwise direction. By torquing the hexagon section nut surface with a wrench, the nut members 35 and 37 are pulled axially toward the center. As it is pulled to the right, nut member 35, via the lip on the compression sleeve, pushes the compression sleeve to the right in the figure, compressing against the nut 35, the fitting 32, which are of relatively hard metal, and against the fluid line, slightly deforming fluid line 31 as illustrated. All of the elements described are formed of relatively hard metal, such as steel. Of those the compression sleeves may be slightly softer in hardness, but is still regarded as a hard metal, in contrast to gold, which is relatively soft.

The compression sleeves are thereby placed in compression both from the rear, by the force exerted by the nut coupling against the lip and by the radial forces in the nut coupling acting to confine the side walls of the compression spring. The conventional theory is that such tight fit alone is sufficient to render the coupling essentially leak free for most essential purposes, but not to the degree desired by the present invention. Apart from the thin soft metal layers, next described, the structure of the fluid coupling is recognized as conventional.

It is also noted that in torquing nut 35 and 37, screwing those coupling members into the associated fitting coupling 32, the portions of the mating threads are likewise placed in compressive engagement, pressing hard against one another.

A thin soft metal layer is applied to the inner surface of sleeve 36, which abutts against conduit 31, such as is represented as 34a in the enlarged partial section view of FIG. 5b; another thin soft metal layer is applied to either or both of the outer surface of sleeve 36 and the internal cylindrical surfaces of nut 35, as represented as 34b in the enlarged partial section view of FIG. 5c, and on fitting 32. This layer is of gold or any of the other soft metals earlier described in this specification and is of a thickness that does not exceed 0.1 mil (0.0025 millimeters), preferably 0.1 mil. On the right side of the figure a like thin soft metal layer is applied to the inner surface of sleeve 38; another thin soft metal layer is applied to either or both of the outer surface of sleeve 38 and the internal cylindrical surfaces of nut 37 and fitting 32. The described coupling should have an initial leak rate on fabrication of less than $10^{-8}$ cubic centimeters per second as measured with a helium leak test at 3,000 psi pressure.

While the foregoing should suffice to form the desired seal, as a precautionary back up seal an additional like thin soft metal layer is applied to the threads of nut 35 and/or fitting 32, such as represented as 34c in the enlarged partial section view of FIG. 5d; and another like thin soft metal layer is applied to the threads of nut 37 and/or fitting 32. As previously noted, portions of the threads are in compressive engagement when the nuts are torqued. The soft metal will deposit itself over the thread surface area and fill any defects that exist, such as scratches, machine marks, rolling marks, pits and any small out of tolerance condition that may exist between the threads. Thus should any leakage path inadvertantly form at the front end of the sleeve 36, any such leakage will be unable to find a leakage path through the threads to the ambient. The same holds true for the other compression sleeve 38 and the threads of nut 37. The additional thin metal layer for the threads thus provides added protection.

Another recognized coupling is illustrated in the partial section side view of FIG. 6 to which reference is made. In this coupling two fluid conduits 41 and 42 are joined in a complete fluid or gas path. An end of fluid line 41 is attached to an end of a male threaded hexagon flange nut member 43. Specifically the attachment to the left extending cylindrical portion of the hexagon flange nut member 43 is a swage joint, that is fabricated with the thin soft metal layer described earlier in the initial embodiments of this specification. The second fluid line 42 is swage fit to a cylindrical sleeve 44. This swage joint is fabricated with a thin soft metal layer in accordance with the earlier described embodiment.

The front surface or face of sleeve 44 is intended to provide a seal surface against the face of nut coupling 43. Another coupling nut 45 contains an internal threaded portion that threadingly engages the threads on the outer surface of the male hexagon flange member 43. The rear wall of nut coupling 45, engages a lip portion of sleeve 44. Thus as nut 45 is screwed onto the mating nut 43 and moves axially to the left, nut 45 produces a pushing action against the sleeve lip 44, forcing the sleeve's front bearing surface against the face of nut 43, a compressive engagement, for a tight fit. Apart from the novel swage joint employed and the soft metal layer, hereafter discussed, the coupling is of conventional design. All such conventional elements are formed to standard dimensional tolerances for such couplings, which typically is about 0.25 millimeters (ten mils), from relatively hard metal.

In accordance with the present improvement, either the bearing surface of sleeve 44 or the front surface of nut 43 or both have applied, by plating or other conventional process, a 0.1 mil (0.0025 millimeter) layer of soft metal, such as gold, which is represented as 46a in the enlarged partial section view of FIG. 6b.

As an additional protection the inner rear wall surface of the nut coupling 45 is likewise plated with a 0.1 mil (0.0025 millimeter) layer of soft metal, such as gold. This metal layer is represented as 46b in the enlarged partial section view of FIG. 6c. If for any reason thus the seal formed at the bearing surface of sleeve 44 proves faulty, the additional sealed surface serve as an additional seal against leakage from the fluid conduit to the ambient, since any path through the flange is blocked.

As an additional protection the threads of hexagon flange 43 are plated with a 0.1 mil (0.0025 millimeter) layer of soft metal, such as gold. This layer is represented as 46c in the enlarged partial section view of FIG. 6d and appears as illustrated in FIG. 5d in connection with the prior fluid coupling design. If for any reason thus the seal formed on the bearing surface of sleeve 44 proves faulty, the additional metal soft seal applied to the external threads serves as an additional seal against leakage from the fluid conduit to the ambient.

Still another coupling is illustrated in FIG. 7 in partial section and in exploded view. In this coupling, conduits 47 and 48 are joined together in a fluid tight sealed relationship by the coupling nut 49, ring seal 51, coupling flange 53 and coupling nut 55. The threaded nut 49 is connected to conduit 47 with a swage joint providing a connector line combination. The swage joint is fabricated in accordance with the initial embodiment of the invention, that includes the 0.1 mil (0.0025 millimeter) thick soft metal layer. Flange 53 is connected to conduit 48, only partially illustrated, with a like swage joint connection as well. This swage connection could include a 0.1 mil (0.0025 millimeter) thick soft metal layer applied to the internal raised lands providing the seal with the tube outer surface.

At the front end the flange contains a cylindrical portion that protrudes from an annular surface containing a short cylindrical groove or well. The cylindrical portion is designed to fit within the recess or well in the mating nut 49, and the well serves as a seal seat or cavity for the metal O-ring 51, which is of a rectangular cross section. A like circular seat is provided internal of the threaded section of nut 49, that is recessed slightly from the end. Apart from the novel swage joints, the fluid coupling structure is recognized as a familiar design.

In this embodiment, a thin metal layer of the soft material, suitably of a thickness no greater than 0.1 mil (0.0025 millimeter), is applied to the seal seat in flange 53, such as is represented as 52a in the enlarged partial section view of FIG. 7b. Alternatively such thin layers are applied on at least the front and rear faces of ring seal 51.

When assembled, nut 55 is screwed onto nut 49 and torqued. In that assembly process the rear internal edge of nut 55 abutts the rear surface of the flange rim, pushing the flange axially toward nut 49. In turn flange 53 engages the ring seal 51 and presses the ring seal against the seal seat in nut 49, placing a compressive force on the ring seal as the nut is torqued. The soft metal layer deforms under such compression to fill any surface scratches or irregularities in the microscopic interstitial space between the elements, just as earlier described for the swage joints in the preceding embodiments.

As added protection like thin layers of soft metal are also plated either on the threads of nut 49 or 55 as shown in FIG. 7c. That seals a secondary leakage path in the unlikely event that the initial seal fails for any reason.

The partial side section view of FIG. 8 shows still another coupling generally of conventional design, similar in structure to that of FIG. 7. This coupling contains conduits 61 and 63, metal O-ring seal 64, and threaded flanges 65 and 67. Conduit 61 is joined to flange 65 in a swage joint to form a unitary assembly. Each of the swage joints is formed according to the technique earlier described for the swage fitting embodiments and includes the 0.1 mil (0.0025 millimeters) soft metal layer. Likewise conduit 63 is joined to flange 69 in a swage joint also forming a unitary assembly. Should the other end of conduit 63 be fastened to another connector as prevents installation of ring 68 and flange 67, it is of course necessary for those elements to be position on the conduit prior to forming the swage joint between flange 69 and conduit 63.

With coupling ring and nut member 67 assembled onto conduit 63, the rear wall of nut member 67 engages and pushes against collar or coupling ring 68. In turn coupling ring 68 engages and presses against the rear of seal 64 and pushes the metal seal against a rim or seal seat formed in the end face of nut coupling member 65. By torquing nut member 67, the metal O-ring seal 64 is compressed against the other two coupling members to seal the fluid path. In accordance with the invention, the rim on the face of nut member 65 contains the thin soft metal layer, as represented as in the enlarged section view of FIG. 8b, and the front seal seat on flange 69 contains another like thin layer as represented as 66b in FIG. 8b. Again these layers are the 0.1 mil (0.0025 millimeter) thick layer of silver, gold, platinum, tin and any other of the soft metals described earlier in this specification.

As in the immediately preceeding embodiments, additional thin soft metal layers are plated on the threads of nut member 67, earlier illustrated as in FIG. 5d, the rear side of the lip on flange 69, as represented as 66c in FIG. 8c, and the external threads of nut coupling 65. In the unlikely event a leak is formed at the O-ring seal 64, the additional layers prevent leakage through the threads or the flange and coupling ring.

In each of the describe fluid couplings, the invention results in smaller initial leak rates than with standard mechanical fittings. The soft metal may be formed of silver, gold, platinum, tin, rhodium, indium, cadmium and many other soft metals. The seal can be obtained on nickel, chrome or any other hard plated surface as well as the conventional titanium, aluminum, and stainless steel tubing. Manufacturers should experience a reduction in time and cost to produce seal surface finishes that are presently required, that is making the surface flat and smooth enough for a good seal. High torque requirements, attendant to hard metal to metal compression for sealing are reduced and the risk of joint damage through overtorque minimized. Normal fitting tolerances are not affected. The soft metal layer can be applied to one or both engaging surfaces.

The foregoing modification has application to any hydralic or fluid system that uses threaded mechanical fittings to join tubes. These are especially prevalent in aircraft spacecraft and chemical industries where the fluid system, including the fittings, is frequently subjected to high levels of vibration along with temperature cycling. The modification has the unique capability of being able to effectively seal onto hard metal plated fluid lines.

Under the compressive force created in the mechanical coupling between elements the soft metal layer deforms and flows into and fills any interstial space for a better seal. It provides a more forgiving surface on which to make the seal and provides a mechanism by which the scratches, machine marks, pits, an other detrimental surface anomalies are repaired through flow of the soft metal. Minor out-of-tolerance conditions existing between the seal cavity, metal seal ring, and inside mating nut surface are compensated for, as well, by the filling action of the soft metal. And the described fluid couplings should have an initial leak rate on fabrication of less than $10^{-8}$ cubic centimeters per second as measured with a helium leak test at 3,000 psi pressure.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a mechanically formed fluid coupling for coupling fluid conduits, said fluid coupling comprising at least two coupling elements formed of relatively hard metal, said coupling elements being joined together solely by mechanical force and maintained in compressive engagement for inhibiting leakage, the improvement comprising:

at least one thin layer of a relatively soft metal located between said coupling elements; said relatively soft metal being of a characteristic hardness that is less than said characteristic hardness of either of said coupling elements and comprising a thickness no greater than 0.1 mil (0.0025 millimeter), said thin layer being deformed in shape to fill interstitial space between said coupling elements, responsive to said compressive engagement between said coupling elements, to provide a seal therebetween having an initial leak rate on fabrication of less than $10^{-8}$ cubic centimeters per second as measured with a helium leak test at 3,000 psi pressure.

2. The invention as defined in claim 1 wherein one of said coupling elements includes a compression sleeve; and wherein the other of said coupling elements includes a first hollow threaded coupling member, said first hollow threaded coupling member being mounted over said compression sleeve for applying a squeezing force on said compression sleeve.

3. In a fluid coupling for coupling fluid conduits, said fluid coupling comprising at least two coupling elements formed of relatively hard metal, wherein one of said coupling elements includes a compression sleeve and wherein the other of said coupling elements includes a first hollow threaded coupling member, said first hollow threaded coupling member being mounted over said compression sleeve for applying a squeezing force on said compression sleeves for inhibiting leakage, the improvement comprising:

at least one thin layer of a relatively soft metal located between said coupling elements; said relatively soft metal being of a characteristic hardness that is less than said characteristic hardness of either of said coupling elements and comprising a thickness no greater than 0.1 mil (0.0025 millimeter), said thin layer being deformed in shape to fill interstitial space between said coupling elements, responsive to said compressive engagement between said coupling elements, to provide a seal therebetween having an initial leak rate on fabrication of less than $10^{-8}$ cubic centimeters per second as measured with a helium leak test at 3,000 psi pressure; a fluid conduit, said fluid conduit being partially ensleeved by said compression sleeve, wherein said compression sleeve squeezes said fluid conduit; a second thin layer of relatively soft metal, said second thin layer of relatively soft metal being located between said compression sleeve and said conduit, said relatively soft metal of said second layer being of a characteristic hardness that is less than said characteristic hardness of either of said compression sleeve and said conduit and comprising a thickness no greater than 0.1 mil (0.0025 millimeter), said thin layer being deformed in shape to fill interstitial space between said compression sleeve and conduit, responsive to said squeezing by said compression sleeve to provide a seal therebetween having an initial leak rate on fabrication of less than $10^{-8}$ cubic centimeters per second as measured with a helium leak test at 3,000 psi pressure.

4. The invention as defined in claim 3, further comprising: a third coupling element, said third coupling element including a second hollow threaded coupling member; said second hollow threaded coupling member threadingly engaging said said first hollow threaded coupling member to place at least a portion of the threads on one in compressive engagement with the threads of the other; a third thin layer of a relatively soft metal, said second thin layer being located between said threads of said threaded members; said relatively soft metal of said third layer being of a characteristic hardness that is less than said characteristic hardness of either of said first and third coupling elements and comprising a thickness no greater than 0.1 mil (0.0025 millimeter), said third thin layer being deformed in shape to fill interstitial space between mating threads of said threaded member, responsive to said compressive engagement to provide a seal therebetween having an initial leak rate on fabrication of less than $10^{-8}$ cubic centimeters per second as measured with a helium leak test at 3,000 psi pressure.

5. The invention as defined in claim 1, wherein one of said coupling elements comprises a metal ring seal.

6. The invention as defined in claim 1, wherein one of said coupling elements comprises: a generally cylindrical collar, said collar containing a ring seal seat located at an end thereof; and a metal ring seal postioned in said seal seat.

7. The invention as defined in claim 1, wherein one of said coupling elements comprises: a generally cylindrical collar, said collar containing a seal surface at an end thereof.

8. The invention as defined in claim 1, wherein said thickness of said relatively soft layer comprises 0.1 mil (0.0025 millimeter).

9. The invention as defined in claim 4, wherein each of said layers of relatively soft metal comprise a thickness of 0.1 mil (0.0025 millimeter).

10. The invention as defined in claim 1, wherein said thin metal layer is a metal selected from the group consisting of: silver, gold, platinum, tin, indium, rhodium, zinc, copper and cadmium.

11. A mechanically formed fluid coupling having an initial leak rate on fabrication of less than $10^{-8}$ cubic centimeters per second as measured with a helium leak test at 3,000 psi pressure, comprising:

a first coupling element having a central passage therethrough and comprising a metal having a characteristic hardness;

a second coupling element having a central passage therethrough and comprising a metal having a characteristic hardness;

said second coupling element being oriented coaxial with respect to said first coupling element and being fastened together in compressive engagement therewith solely by application of mechanical force; and a thin layer of a soft metal material located between said first and second coupling elements; said thin layer of soft metal material being of a lesser hardness than the characteristic hardness of either of said first or second coupling elements, said thin layer being deformed in shape to fill interstitial space between said first and second coupling elements, responsive to said compressive engagement between said coupling elements; and wherein said thin metal layer comprises a thickness of 0.1 mil (0.0025 millimeters).

12. A mechanically formed fluid coupling having an initial leak rate on fabrication of less than $10^{-8}$ cubic centimeters per second as measured with a helium leak test at 3,000 psi pressure, comprising:

a first coupling element having a central passage therethrough and comprising a metal having a characteristic hardness;

a second coupling element having a central passage therethrough and comprising a metal having a characteristic hardness;

said second coupling element being oriented coaxial with respect to said first coupling element; and connecting means associated with each of said first and second coupling elements for producing a mechanical force between said first and second coupling elements to join said first coupling element in forced engagement with said second coupling element;

a thin layer of a soft metal material located between said first and second coupling elements; said thin layer of soft metal material being of a lesser hardness than the characteristic hardness of either of said first or second coupling elements, said thin layer, responsive to said mechanical force, being deformed in shape to fill interstitial space between said first and second coupling elements and otherwise coupling said mechanical force therethrough; and wherein said thin metal layer comprises a thickness of 0.1 mil (0.0025 millimeter).

13. A fluid coupling having an initial leak rate on fabrication of less than $10^{-8}$ cubic centimeters per second as measured with a helium leak test at 3,000 psi pressure, comprising:

a first coupling element having a central passage therethrough and comprising a metal having a characteristic hardness;

a second coupling element having a central passage therethrough and comprising a metal having a characteristic hardness;

said second coupling element being oriented coaxial with respect to said first coupling element; and connecting means associated with each of said first and second coupling elements for producing a compressive force between said first and second coupling elements to join said first coupling element in compressive engagement with said second coupling element;

said connecting means comprising: a male screw thread located on one of said coupling elements and a mating female screw thread located on the other of said coupling elements; at least one of said fluid coupling elements including a seat for a O-ring seal; and an O-ring seal comprising a metal having a characteristic hardness located in compressive engagement between said seat of said one coupling element and an abutting face of said second coupling element;

a thin layer of a soft metal material located between said first and second coupling elements; said thin layer of soft metal material being of a lesser hardness than the characteristic hardness of either of said first or second coupling elements, said thin layer, responsive to said compressive force, being deformed in shape to fill interstitial space between said first and second coupling elements and otherwise coupling said compressive force therethrough; and wherein said thin metal layer comprises a thickness of 0.1 mil (0.0025 millimeter and said thin layer of soft metal material being located on at least one of said seal seat and said O-ring seal;

and further comprising a second thin layer of soft metal material substantially identical in hardness and in thickness to said first thin layer of soft metal material, said second thin layer being located on at least one of said O-ring seal and said abutting face; and said second thin layer, responsive to said compressive force, being deformed in shape to fill interstitial space between said O-ring seal and said abutting face.

14. The invention as defined in claim 13, further comprising a third thin layer of a soft metal material located between said first and second coupling elements at a position spaced from said first thin layer of soft metal material, said third thin layer being located on at least one of said male and female screw threads; said third thin layer being substantially identical in hardness and thickness to said first thin layer; said third thin layer, responsive to said compressive force, being deformed in shape to fill interstitial space between said mating threads.

\* \* \* \* \*